UNITED STATES PATENT OFFICE.

ARGYLE W. TUCKER AND ELIHU M. TUCKER, OF MANSFIELD, TEXAS.

PROCESS OF MAKING ELECTRIC GOLD PICTURES.

SPECIFICATION forming part of Letters Patent No. 372,720, dated November 8, 1887.

Application filed August 28, 1885. Renewed July 2, 1887. Serial No. 243,271. (No specimens.)

*To all whom it may concern:*

Be it known that we, ARGYLE W. TUCKER and ELIHU M. TUCKER, of Mansfield, in the county of Tarrant and State of Texas, have invented a new and useful Improvement in the Process of Making Electric Gold Pictures, which improvement is fully set forth in the following specification.

Heretofore the principal method for making porcelain pictures was first to clean the plate, after which it was flowed with albumen or collodion and left to dry, and then sensitized with chloride of silver in the usual manner. The plate is then treated in a dark room, and afterward exposed to sunlight with a negative in close contact with it, and after printing it is washed and toned the same as albumen-paper photographs, and fixed with hyposulphate of soda, washed, and dried, after which it is fit for use.

The object of this invention is to provide a photographing process whereby pictures may be produced on any hard white surface—such as marble, porcelain, glass, or analogous material—by treating the plate or substance on which the picture is made so as to make the gold adhere firmly thereto, removing all oxide of silver from the plate in such a manner that the gold will be deposited in its stead and reinstate the picture; the application of electricity in connection with the process, so as to deposit the gold on the plate and make it adhere firmly thereto, and the process by which light without a condenser may pass through a negative for making an exposure on a sensitized plate or any other substance in connection with the camera.

To carry our invention into effect we first prepare the plate or substance by treating it with chloride of sodium (common salt) and gum-arabic, in equal proportions, dissolved in water. This preparation is left to stand about twelve hours to dry, then washed thoroughly, and again dried before using. After sensitizing in the usual manner, the plate is then placed in a camera and exposed to the action of the light transmitted in the camera, after which it is developed with the following solution, namely: protosulphate of iron, four ounces, twenty grains strong to the ounce; acetic acid, one-half ounce; sulphate of copper, one-half dram, after which it is thoroughly washed. We then treat it with cyanide of potassium until all the oxide of silver is removed or the picture is nearly invisible, and then wash thoroughly. We then hold a piece of zinc plate in close contact with the back of the plate, making the necessary connection with the front surface to form an electric current on the plate, after which it is treated to pure chloride-of-gold solution until the picture reappears and reaches the desired shade or tone, then again washed thoroughly and dried. If a jet black is desired, the plate is subjected to hot fumes of mercury. The plate in the gold process may be electrified by a battery or any other means. This sets the gold firmly on the plate or substance, and may be polished until the gold is clearly seen and is as indestructible as the natural gold.

Having described our invention, what we claim as new is—

1. The process of producing pictures on porcelain or any hard white surface, which consists in preparing the plate by treating it with chloride of sodium and gum-arabic, then drying, washing, and drying the same, then sensitizing, then exposing the plate in a camera to the light, and afterward developing it with a solution of protosulphate of iron, acetic acid, and sulphate of copper, then washing the plate and treating it with cyanide of potassium, then washing the plate again, then in forming an electric current on the plate and afterward treating it to pure chloride of gold, and finally washing and drying the plate.

2. The process of making electric gold pictures, which consists in treating the plate or substance which has been duly exposed and developed, as described, with cyanide of potassium to remove all the oxide of silver, so that the metallic gold will be deposited and thus reinstate the picture, and the application of the current of electricity in the process, so as to assist in depositing the gold on the plate, and passing the light through the negative for making an exposure on sensitive plates on the camera, so as to dispense with the condenser, all substantially as described.

In testimony that we claim the foregoing we have hereunto set our hands, this 28th day of July, 1885, in the presence of witnesses.

ARGYLE W. TUCKER.
    ELIHU M. TUCKER.

Witnesses:
 P. W. LOWE,
 F. G. WHITTENBERG.